United States Patent
Bhatia et al.

(10) Patent No.: US 10,055,671 B2
(45) Date of Patent: Aug. 21, 2018

(54) AUTOMATIC ASSESSMENT OF PERCEPTUAL VISUAL QUALITY OF DIFFERENT IMAGE SETS

(71) Applicants: Parmeet Singh Bhatia, Bangalore (IN); Amit Kale, Bangalore (IN)

(72) Inventors: Parmeet Singh Bhatia, Bangalore (IN); Amit Kale, Bangalore (IN)

(73) Assignee: Siemens Aktiengesellschaft, München (DE)

( * ) Notice: Subject to any disclaimer, the term of this patent is extended or adjusted under 35 U.S.C. 154(b) by 205 days.

(21) Appl. No.: 14/752,395

(22) Filed: Jun. 26, 2015

(65) Prior Publication Data

US 2015/0379373 A1    Dec. 31, 2015

(30) Foreign Application Priority Data

Jun. 26, 2014   (IN) .............................. 702/KOL/2014

(51) Int. Cl.
| | |
|---|---|
| *G06K 9/66* | (2006.01) |
| *G06K 9/62* | (2006.01) |
| *G06K 9/03* | (2006.01) |
| *G06T 7/00* | (2017.01) |
| *H04N 17/00* | (2006.01) |

(52) U.S. Cl.
CPC ........... *G06K 9/6212* (2013.01); *G06K 9/036* (2013.01); *G06T 7/0002* (2013.01); *G06T 2207/30168* (2013.01); *H04N 17/002* (2013.01)

(58) Field of Classification Search
CPC ........ A61B 5/1176; G06T 7/001; G06T 7/248

USPC ............... 382/171, 197, 209, 260, 274, 275; 358/537, 538, 452, 463
See application file for complete search history.

(56) References Cited

U.S. PATENT DOCUMENTS

| | | | | |
|---|---|---|---|---|
| 5,742,792 A | * | 4/1998 | Yanai ..................... | G06F 3/0601 710/1 |
| 6,822,675 B2 | * | 11/2004 | Jung ..................... | H04N 17/004 348/180 |
| 7,406,211 B2 | * | 7/2008 | Pena ....................... | G06T 5/002 382/275 |
| 7,684,587 B2 | * | 3/2010 | Chen ..................... | G06T 1/0028 375/240.27 |
| 7,973,753 B2 | * | 7/2011 | Mori ..................... | G09G 3/3406 345/690 |

(Continued)

OTHER PUBLICATIONS

On Advances in Statistical Modeling of Natural Images, Author: A. Srivastava, A.b. IEE, E.P. Simoncelli, S.C. Zhu Journal of mathematical imaging and vision 18:17-33, 2003.

*Primary Examiner* — Yosef Kassa
(74) *Attorney, Agent, or Firm* — Lempia Summerfield Katz LLC (57) ABSTRACT

Perceptual visual quality of different image sets is automatically assessed. A computing device includes a processor and a memory coupled to the processor. The memory includes an image assessment module configured to obtain features from each of the image sets, and generate feature vectors corresponding to the obtained features. The image quality assessment module is configured to compute a set of quality scores corresponding to the feature vectors associated with each of the image sets. The image quality assessment module is also configured to automatically determine an image set having an optimal perceptual visual quality among the image sets using the corresponding set of quality scores.

15 Claims, 3 Drawing Sheets

(56) References Cited

U.S. PATENT DOCUMENTS

| | | | | |
|---|---|---|---|---|
| 8,144,987 B2* | 3/2012 | Cocosco | ............... | G06T 7/149 |
| | | | | 382/128 |
| 8,259,903 B1* | 9/2012 | Toh | ............... | 378/91 |
| 8,306,297 B2* | 11/2012 | Fu | ............... | A61N 5/1049 |
| | | | | 382/128 |
| 8,331,443 B2* | 12/2012 | Rhie | ............... | H04N 17/00 |
| | | | | 375/240.01 |
| 8,345,940 B2* | 1/2013 | Mattiuzzi | ............... | G06F 19/321 |
| | | | | 382/128 |
| 8,401,331 B2* | 3/2013 | Sherif | ............... | G06T 7/0004 |
| | | | | 382/100 |
| 8,422,795 B2* | 4/2013 | Pahalawatta | ............... | G06T 7/0002 |
| | | | | 382/197 |
| 8,472,755 B2* | 6/2013 | Hsieh | ............... | G06T 3/4007 |
| | | | | 382/299 |
| 8,582,855 B2* | 11/2013 | Koehler | ............... | A61B 6/5258 |
| | | | | 382/131 |
| 8,660,363 B2* | 2/2014 | Rezazadeh | ............... | G06K 9/4604 |
| | | | | 382/199 |
| 8,718,145 B1* | 5/2014 | Wang | ............... | H04N 19/12 |
| | | | | 375/240.02 |

\* cited by examiner

AUTOMATIC ASSESSMENT OF PERCEPTUAL VISUAL QUALITY OF DIFFERENT IMAGE SETS

This application claims the benefit of IN 702/KOL/2014, filed on Jun. 26, 2014, which is hereby incorporated by reference in its entirety.

BACKGROUND

The present embodiments relate to the field of image quality assessment.

Generally, images (e.g., digital photograph, medical image, CT scan image, etc.) go through many stages of processing that affect image quality before the images are outputted. For example, each stage of image processing may introduce distortion that may reduce quality of final image produced. Images acquired by cameras may exhibit distortions due to optics, sensor noise, colour calibration, exposure control, camera motion, etc. Other sources of distortion may include compression algorithms and bit errors. The type of imaging platforms used for processing an image may also affect the quality of image.

Image quality is a characteristic of an image that relates to perceived image degradation as compared to an ideal or perfect image reference. Typically, quality of image is measured through image quality assessment.

In one of the existing techniques, image quality assessment is performed based on Human difference mean opinion scores (DMOS). In human DMOS based techniques, a number of people are asked to rate an image based on image quality perceived through a naked eye. However, the human DMOS based technique is expensive as well as time consuming. In another technique, the image quality assessment is performed based on peak signal to noise ratio (PSNR) quality measure. In yet another technique, the image quality assessment is performed based on mean square error (MSE) quality measure. However, these techniques use a reference image for comparison. Also, these techniques provide inconsistent results with respect to the human DMOS based technique. In order to overcome the above problems, metrics such as structure similarity (SSIM) index that are cognizant with the human DMOS based technique are developed. In the metrics based technique, quality of an image is assessed with respect to initial uncompressed or distortion free image as the reference image. However, the metrics based technique may not be suitable for comparing image quality of two different image sets. For example, the metrics based technique may use a sophisticated registration technique in order to properly align different images to compute image quality of the two different image sets.

The term "different image sets" refers to two sets of images generated using different imaging platforms. The different imaging platforms may use different compression algorithms, image capturing algorithms, different modalities and so on. For example, a specific type of image produced by computerised tomography (CT) scanners from two different manufacturers are referred to as 'different image sets'.

SUMMARY AND DESCRIPTION

The scope of the present invention is defined solely by the appended claims and is not affected to any degree by the statements within this summary.

In light of the above, there exists a need for automatically assessing perceptual visual quality of different image sets.

The present embodiments may obviate one or more of the drawbacks or limitations in the related art. For example, a method and apparatus for automatically assessing perceptual visual quality of different image sets are provided.

A method of automatically assessing perceptual visual quality of a plurality of image sets is provided. For example, the image sets are generated using different imaging platforms. The method includes obtaining features from each image set of the plurality of image sets. Each image set includes a plurality of images. For example, the features correspond to pixels of each image in each image set. The features obtained from each image set are a measure of perceptual visual quality of respective image sets. The features are obtained from the image sets using any well known feature extraction algorithm. The method further includes generating a set of quality scores for each image set of the plurality of image sets based on the corresponding features. The set of quality scores indicates perceptual visual quality of respective image sets. The method also includes automatically determining at least one image set of the plurality of image sets having an optimal perceptual visual quality among the plurality of image sets using the corresponding set of quality scores. The method also includes declaring the at least one image set as having optimal perceptual visual quality among the plurality of image sets. Thus, the image set having optimal perceptual visual quality is automatically identified among the image sets. Advantageously, time and effort required to identify the image set having optimal perceptual visual quality is significantly reduced.

In computing the set of quality scores of each of the image sets, the method includes generating feature vectors corresponding to the features obtained from each of the plurality of image sets. For example, a feature vector is an n-dimensional vector of the features obtained from the image sets. The method also includes computing the set of quality scores corresponding to the feature vectors associated with each of the plurality of image sets.

In computing the set of quality scores corresponding to the feature vectors, the method includes generating probability distribution of the feature vectors of each of the plurality of image sets corresponding to a first domain. The method also includes determining whether there is overlap between the probability distribution of the feature vectors of each image set of the plurality of image sets corresponding to the first domain and probability distribution of feature vectors of a reference image set corresponding to a second domain. For example, the first domain may be a medical domain, and the second domain may be computer vision domain. If overlap between the probability distribution of the feature vectors in the first domain and the second domain exists, the method includes assigning weight values to the feature vectors of the reference image set corresponding to the second domain, and retraining a regressor algorithm for each of the image sets based on the feature vectors associated with the reference image set, the corresponding weight values of the feature vectors, and corresponding quality scores. The method includes computing the set of quality scores corresponding to the feature vectors associated with each image set of the plurality of image sets in the first domain using the respective retrained regressor algorithm.

In automatically determining the at least one of the plurality of image sets, the method includes comparing the set of quality scores corresponding to the plurality of image sets. The method also includes determining the at least one image set having optimal perceptual visual quality among the plurality of image sets based on an outcome of comparison.

In assigning the weight values to the feature vectors of the reference image set corresponding to the second domain, the method includes computing a measure of difference between the probability distribution of the feature vectors associated with the image sets in the first domain and the probability distribution of the feature vectors associated with the reference image set in the second domain. The method also includes assigning a unique weight value to each of the feature vectors of the reference image set corresponding to the second domain based on the computed measure. Thus, the weight values assigned to the features vectors of the reference image set facilitates to match the probability distribution of the second domain with the probability distribution of the first domain.

In one or more of the present embodiments, an apparatus including a processor and a memory coupled to the processor is provided. The memory includes an image quality assessment module. The image quality assessment module is capable of obtaining features from each image set of a plurality of image sets, and generating a set of quality scores for each image set of the plurality of image sets based on the corresponding features. The image quality assessment module is operable to automatically determine at least one image set having an optimal perceptual visual quality among the plurality of image sets using the corresponding set of quality scores. Additionally, the image quality assessment module is operable to declare the at least one image set as having optimal perceptual visual quality among the plurality of image sets.

In computing the set of quality scores for each image set of the plurality of image sets, the image quality assessment module is operable to generate feature vectors corresponding to the features obtained from each image set of the plurality of image sets. The image assessment module is operable to compute the set of quality scores corresponding to the feature vectors associated with each image set of the plurality of image sets.

In computing the set of quality scores corresponding to the feature vectors, the image quality assessment module is operable to generate a probability distribution of the feature vectors of each of the plurality of image sets corresponding to a first domain. The image quality assessment module is also operable to determine whether there is overlap between the probability distribution of the feature vectors of each image set of the plurality of image sets corresponding to the first domain and the probability distribution of feature vectors of a reference image set corresponding to a second domain. If there exists overlap between the probability distribution of the feature vectors in the first domain and the second domain, the image quality assessment module is operable to assign weight values to the feature vectors of the reference image set corresponding to the second domain. The image quality assessment module is operable to compute the set of quality scores corresponding to the feature vectors associated with each image set of the plurality of image sets in the first domain based on the weights assigned to the corresponding feature vectors of the reference image set in the second domain.

In assigning the weight values to the feature vectors of the reference image set corresponding to the second domain, the image quality assessment module is operable to compute a measure of difference between the probability distribution of the feature vectors associated with each image set in the first domain and the probability distribution of the feature vectors associated with the reference image set in the second domain. The image quality assessment module is also operable to assign a unique weight value to each of the feature vectors of the reference image set corresponding to the second domain based on the computed measure of difference.

In automatically determining the at least one image set of the plurality of image sets, the image quality assessment module is operable to compare the set of quality scores corresponding to the plurality of image sets, and determine the at least one image set among the plurality of image sets based on the outcome of comparison. In this manner, the apparatus automatically assesses perceptual visual quality of the image sets.

The apparatus may be a computing device such as desktop computer, laptop computer, server computer, tablet, smart phone and the like. The image quality assessment module may be stored in the memory in the form of machine-readable instructions that are executable by the processor.

One or more of the present embodiments also provide a non-transitory computer-readable storage medium having instructions stored therein. When executed by a computing device, the instructions cause the computing device to perform method acts described above.

BRIEF DESCRIPTION OF THE DRAWINGS

The illustrated embodiments are intended to illustrate, but not limit the invention.

DETAILED DESCRIPTION

Various embodiments are described with reference to the drawings, where like reference numerals are used to refer to like elements throughout. In the following description, for the purpose of explanation, numerous specific details are set forth in order to provide thorough understanding of one or more embodiments. Such embodiments may be practiced without these specific details.

Figure 1:
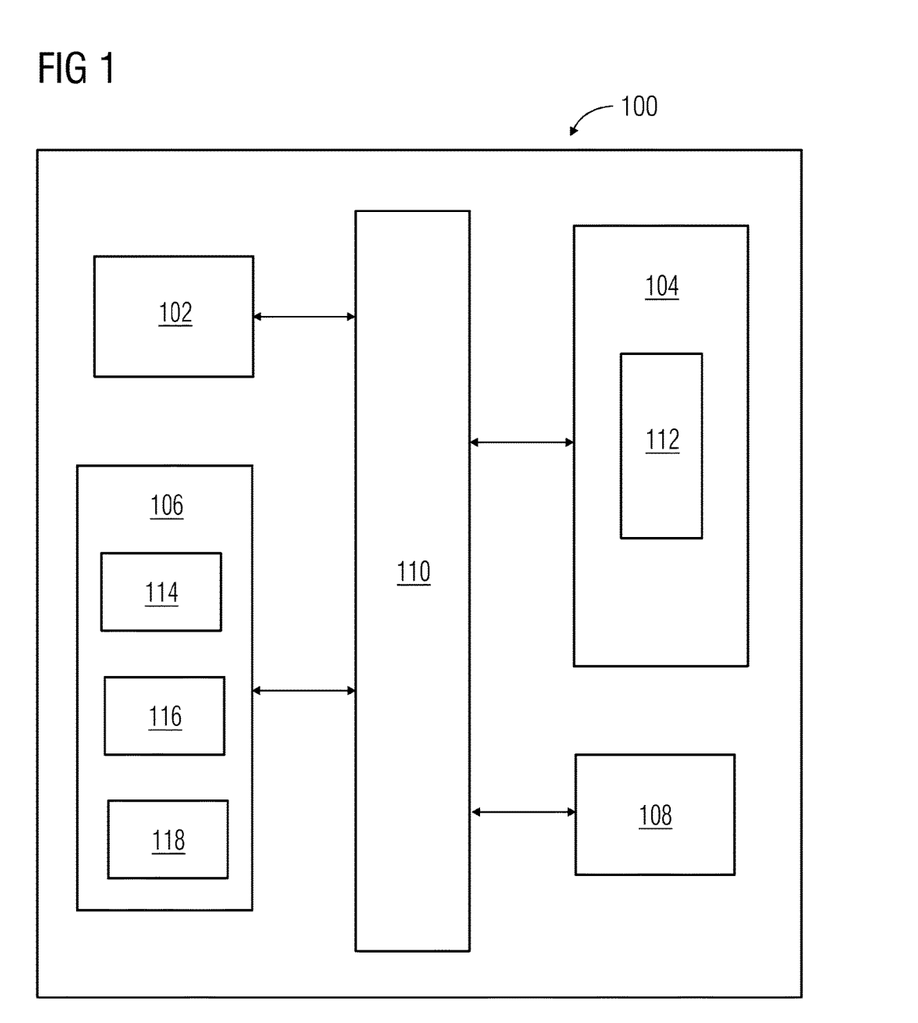
FIG. 1 is a block diagram illustrating an exemplary computing device configured for automatically assessing perceptual visual quality of different image sets.

FIG. 1 is a block diagram illustrating an exemplary computing device 100 configured for automatically assessing perceptual visual quality of different image sets. The computing device 100 may be a personal computer, a laptop computer, a server computer, a tablet and the like. In FIG. 1, the computing device 100 includes a processor 102, a memory 104, a storage unit 106, input/output devices 108, and a bus 110.

The processor 102 may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 102 may also include embedded controllers, such as generic or programmable logic devices or arrays, application specific integrated circuits, single-chip computers, and the like.

The memory 104 may be volatile memory and non-volatile memory. A variety of computer-readable storage media may be stored in and accessed from the memory 104. The memory 104 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. As depicted, the memory 104 includes an image quality assessment module 112 stored in the form of machine-readable instructions on any of the above-mentioned storage media and executable by the processor 102. For example, when executed by the processor 102, the image quality assessment module 112 causes the processor 102 to crop a region of interest for each of the image sets and extract features from the cropped region of interest associated with each of image sets. The image quality assessment module 112 then causes the processor 102 to generate feature vectors corresponding to the features obtained from each of the image sets. For example, the features extracted from each image set include features that quantify quality of each image set and/or differentiate between different types of distortions that may be present in the image set. Based on these features, the processor 102 generates feature vectors for each image set. In an exemplary implementation, the feature vectors are hyper-parameters obtained by modeling natural scene statistics associated with each image set. This is possible since deviations from regularity of natural scene statistics measure perceptual visual quality of each image set. For example, for an intensity of image I(i,j), coefficients O(i,j) (e.g., mean subtracted contrast normalized (MSCN)) coefficients are computed. The coefficients are computed using the following equation:

$$O(i, j) = \frac{I(i, j) - \mu(i, j)}{\sigma(i, j) + C}$$

where C is a constant. $\mu(i,j)$ and $\sigma(i,j)$ are computed using the following equations, respectively:

$$\mu(i, j) = \sum_{k=-K}^{K} \sum_{l=-L}^{L} w_{k,l} I_{k,l}(i, j)$$

$$\sigma(i, j) = \sqrt{\sum_{k=-K}^{K} \sum_{l=-L}^{L} w_{k,l} (I_{k,l}(i, j) - \mu(i, j))^2}$$

where W is a two dimensional symmetric Gaussian weighted function sampled out to three standard deviations and rescaled to unit volume. The values of K and L are equal to 3. The MSCN coefficients O(i,j) and their combinations are then modeled using generalized Gaussian distribution (GGD) and asymmetric generalized Gaussian distribution (AGGD), respectively. Accordingly, hyper-parameters of the modeled coefficients and their combinations are used as feature vectors associated with each image in each image set.

The image quality assessment module 112 causes the processor 102 to compute a set of quality scores corresponding to the feature vectors associated with each of the image sets. The image quality assessment module 112 causes the processor 102 to determine at least one image set among the image sets using the corresponding set of quality scores.

The storage unit 106 may be a non-transitory storage medium configured for storing databases. For example, the storage unit 106 contains an image database 114 storing different image sets for which quality assessment is to be performed. The storage unit 106 also contains a labeled database that stores feature vectors and the corresponding set of quality scores for a reference image set in a domain different from the image sets in the image database 114. For example, the image sets stored in the image set database 114 may be associated with medical domain while the feature vectors stored in the labeled database 116 are stored for the image set in computer vision domain. The storage unit 106 includes a score database 118 for storing a set of quality scores associated with each of the image sets. The image database 114, the labeled database 116, and the score database 118 may reside at a remote server and may be remotely accessed by the computing device 100 via a network connection.

The input/output devices 108 may include keyboard, keypad, monitor, touch sensitive display screen, mouse and the like. The input device/output devices 108 enable a user to interface with the computing device 100. For example, the input device may enable selection of image sets with a perceptual visual quality to be determined. The output device may output the image set having optimal perceptual visual quality compared to other image sets. The bus 110 may act as an interface between the processor 102, the memory 104, the storage unit 106, and the input/output module 108. Although not shown in FIG. 1, the computing device 100 may include a communication module for interacting with other computing devices over a network. For example, the communication module may assist in accessing the image sets when stored on the remote server.

One or more of the present embodiments may be implemented in client-server architecture, where a remote server hosts the image quality assessment module 112, and several client devices access the image quality assessment module 112 for determining perceptual visual quality of image sets. Also, one or more of the present embodiments may be implemented in a cloud computing environment, where the image quality assessment module 112 is hosted on a cloud server.

Figure 2:
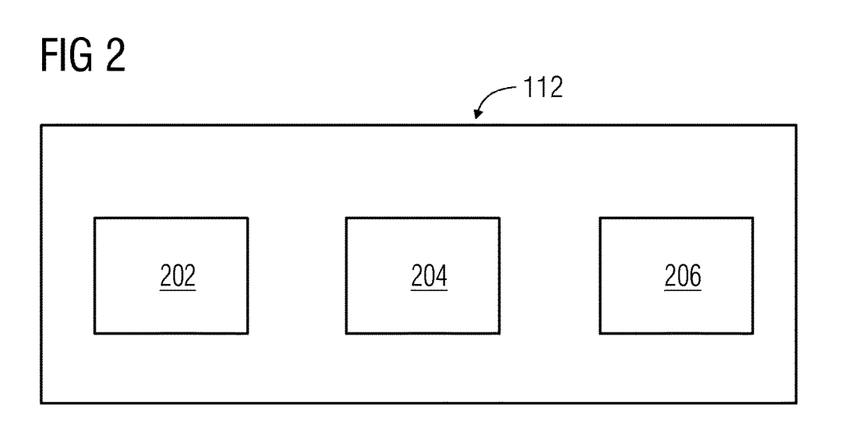
FIG. 2 illustrates a block diagram of the image quality assessment module of FIG. 1 according to an embodiment.

FIG. 2 illustrates a block diagram of one embodiment of the image quality assessment module 112 of FIG. 1. The image quality assessment module 112 includes a feature extraction module 202, a score generation module 204, and a perceptual visual quality determination module 206.

The feature extraction module 202 extracts features from each of the image sets. For example, the feature extraction module 202 may extract the features from each of the image sets using any feature extraction algorithm well known in the art. The score generation module 204 generates feature vectors corresponding to the extracted features associated with each image set. The score generation module 204 computes a set of quality scores corresponding to the feature vectors for each of the image sets. In an exemplary implementation, the score generation module 204 computes the set of quality scores using domain adaptation technique. The domain adaptation technique is explained in greater detail below.

The perceptual visual quality determination module 206 compares the set of quality scores corresponding to the features vectors of each of the image sets and determines an image set(s) having optimal perceptual visual quality based on the outcome of comparison. For example, the perceptual visual quality determination module 206 performs a statistical hypothesis test to determine the image set having optimal perceptual visual quality. The statistical hypothesis test is a method of statistical inference using data from scientific study. In an exemplary implementation, the perceptual visual quality determination module 206 uses a pair difference test in order to compare the set of scores associated with the image sets generated from different imaging platform. In another exemplary implementation, the perceptual visual quality determination module 206 uses a sign rank test when distribution of differences between the image sets is symmetric about median. In yet another exemplary implementation, the perceptual visual quality determination module 206 uses a Mann-Whitney U test to compare perceptual visual quality of the image sets of different modalities such as Magnetic Resonance (MR) and Computerized Tomography (CT). The perceptual visual quality determination module 206 declares the determined image set(s) as image set having optimal perceptual visual quality among the image sets.

Figure 3:
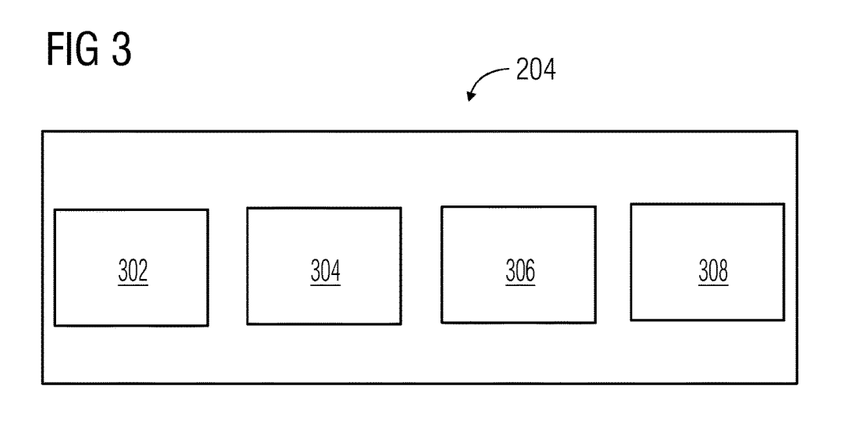
FIG. 3 illustrates a block diagram of the score computation module of FIG. 2 according to an embodiment.

FIG. 3 illustrates a block diagram of the score computation module 204 of FIG. 2 according to an embodiment. The score computation module 204 includes a probability distribution computation module 302, a domain overlap determination module 304, a domain adaptation module 306, and a quality score computation module 308.

The probability distribution computation module 302 computes probability distribution of the feature vectors associated with each of the image sets. The image sets pertain to a first domain such as medical domain. The domain overlap determination module 304 determines whether there is overlap between the probability distribution of the feature vectors of the respective image set pertaining to the first domain and probability distribution of the feature vectors of a reference image set pertaining to a second domain. The second domain is a domain different from the first domain. For example, the second domain may be a computer vision domain. In an exemplary implementation, the probability distribution computation module 302 computes overlap (OVL(X,Y)) between the probability distribution in the first domain and the probability distribution in the second domain using following equation:

$$OVL(X, Y) = \frac{1}{N}\sum_{i=1}^{N}\prod_{j=1}^{d} k_j^f(x_i^j) < \prod_{j=1}^{d} k_j^g(x_i^j) + \frac{1}{M}\sum_{i=1}^{M}\prod_{j=1}^{d} k_j^g(y_i^j) < \prod_{j=1}^{d} k_j^f(y_i^j)$$

where $X=\{x_i\}_{i=1 \ldots N}$ and $Y=\{y_i\}_{i=1 \ldots M}$ are two multivariate random variables of the probability distribution in the first domain and the probability distribution in the second domain, and $$k_j^f(x) = \frac{c_j^f}{h_j^f}\sum_{i=1}^{N} K\left(\frac{x-x_i^j}{h_j^f}\right) \text{ and } k_j^g(y) = \frac{c_j^g}{h_j^g}\sum_{i=1}^{N} K\left(\frac{y-y_i^j}{h_j^g}\right)$$

are univarite kernel density estimators for $j^{th}$ of multivariate random variables X and Y, respectively. If the value OVL (X,Y) is within expected range of values, then it implies that overlap between the probability distributions in the first domain and the second domain exists.

If overlap in the probability distribution is found, then the domain adaptation module 306 computes a measure of difference between the probability distribution of the feature vectors of the respective image set and the probability distribution of the feature vectors of the reference image set. In an exemplary implementation, the domain adaptation module 306 computes the measure of difference between the probability distribution of the feature vectors in both domains using Kullback-Leibler (KL) divergence algorithm. The measure of difference in probability distribution is computed to address problem of domain shift between the probability distribution of feature vectors of two different domains. Thus, in order to match the probability distributions of the first domain and the second domain, the domain adaptation module 306 assigns a unique weight value to each of the feature vectors of the reference image set based on the computed measure of difference. In the above, instance weighting for covariance shift based approach is used to resolve domain shift problem. However, other domain adaptation approaches such as self-labeling based approach, changes in feature representation based approach, and cluster based learning approach may be used.

The quality score computation module 308 retrains a regressor algorithm for each of the image sets based on the feature vectors associated with the reference image set, the corresponding weight values, and corresponding quality scores. For example, the retrained regressor algorithm of one image set may differ from another image set. The quality score computation module 308 computes a set of quality scores including quality scores that correspond to the feature vectors of each image set using the respective regressor algorithm.

Figure 4:
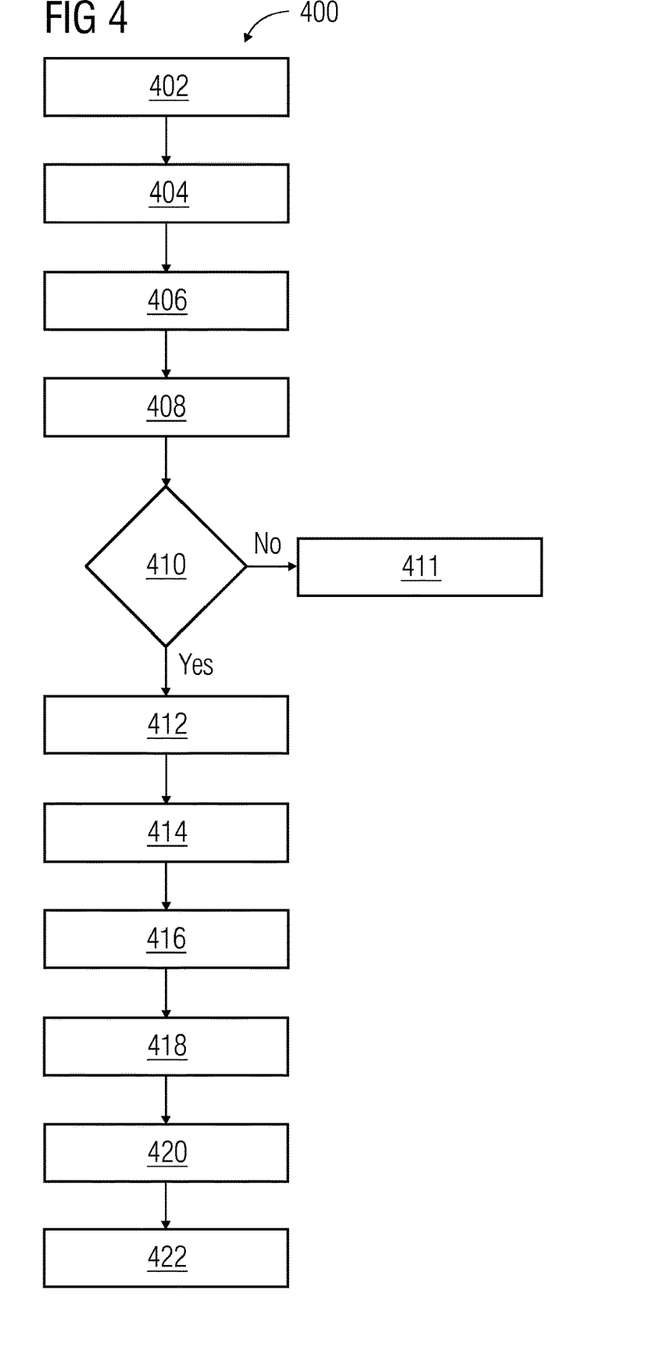
FIG. 4 is a process flowchart illustrating an exemplary method of automatic assessment of perceptual visual quality of image sets according to an embodiment.

FIG. 4 is a process flowchart illustrating an exemplary method of automatic assessment of perceptual visual quality of image sets. At act 402, different image sets are input for assessing perceptual visual quality of the different image sets. Each image set includes a plurality of images. The different image sets may belong to a specific domain such as medical domain. The image sets are generated using imaging devices manufactured by different vendors, using different compressing algorithm, different modalities, different imaging platforms and so on. In order to determine which of the imaging devices is better, it is determined which image sets have optimal perceptual visual quality.

At act 404, features that are associated with perceptual visual quality are obtained from each of the image sets. In an exemplary implementation, a region of interest is cropped from the image sets, and the features are extracted from the cropped region of interest in the corresponding image sets. At act 406, feature vectors corresponding to the features of the respective image sets are generated. At act 408, probability distribution of the feature vectors associated with each image set is computed. At act 410, it is determined whether the probability distribution of the feature vectors of each image set overlaps with probability distribution of feature vectors of a reference image set pertaining to a domain different than the input image sets. If the probability distribution does not overlap, then at act 411, the process is terminated. If the probability distribution overlap, then at act 412, a measure of difference between the probability distribution of the feature vectors associated with each image set and the probability distribution of the feature vectors associated with the reference image set is determined. In an exemplary implementation, the measure of difference between the probability distribution of the feature vectors in both domains is computed using a KL divergence method.

At act 414, a unique weight value is assigned to the corresponding feature vectors associated with reference image set based on the computed measure of difference. At act 416, a regressor algorithm is retrained for each image set based on the feature vectors associated with the reference image set, the corresponding weight values and corresponding quality scores. The retrained regressor assists in matching the probability distribution of the feature vectors of respective image set with the probability distribution of the feature vectors of the reference image set. At act 418, a set of quality scores corresponding to the feature vectors associated with each image set is computed using the respective retrained regressor.

At act 420, an image set that is having optimal perceptual visual quality is automatically determined among the image sets using the corresponding set of quality scores. In an exemplary implementation, the set of quality scores corresponding to each of the image sets are compared using hypothesis test. In this implementation, the image set is identified among the image sets based on the outcome of comparison. The identified image set is an image set having optimal perceptual visual quality. At act 422, the identified image set is declared as having optimal perceptual visual quality among the image sets. In this manner, perceptual visual quality of the image sets is automatically assessed.

One or more of the present embodiments may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may include, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium, as signal carriers are not included in the definition of physical computer-readable medium, which include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

While the present invention has been described in detail with reference to certain embodiments, the present invention is not limited to those embodiments. In view of the present disclosure, many modifications and variations would be identified by those skilled in the art without departing from the scope of the various embodiments of the present invention, as described herein. The scope of the present invention is, therefore, indicated by the following claims rather than by the foregoing description. All changes, modifications, and variations coming within the meaning and range of equivalency of the claims are to be considered within their scope.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of automatically assessing perceptual visual quality of a plurality of image sets, the method comprising:
    obtaining, by a processor, features from each image set of the plurality of image sets;
    generating a set of quality scores for each image set of the plurality of image sets based on the corresponding features;
    comparing the set of quality scores corresponding to the plurality of image sets; and
    automatically determining at least one image set of the plurality of image sets having an optimal perceptual visual quality among the plurality of image sets based on the outcome of the comparison.

2. The method of claim 1, further comprising declaring the at least one image set as having optimal perceptual visual quality among the plurality of image sets.

3. The method of claim 1, wherein generating the set of quality scores for each image set of the plurality of image sets comprises:
    generating feature vectors corresponding to the features obtained from each of the image sets; and
    computing the set of quality scores corresponding to the feature vectors associated with each of the image sets.

4. The method of claim 3, wherein computing the set of quality scores corresponding to the feature vectors comprises:
    generating probability distribution of the feature vectors of each of the image sets corresponding to a first domain;
    determining whether there is overlap between the probability distribution of the feature vectors of each of the image sets corresponding to the first domain and probability distribution of feature vectors of a reference image set corresponding to a second domain;
    assigning weight values to the feature vectors of the reference image set corresponding to the second domain when overlap between the probability distribution of the feature vectors in the first domain and the second domain exists;
    retraining a regressor algorithm for each of the image sets based on the feature vectors associated with the reference image set, the corresponding weight values of the feature vectors, and corresponding quality scores; and
    computing the set of quality scores corresponding to the feature vectors associated with each of the image sets in the first domain using the respective retrained regressor algorithm.

5. The method of claim 1, wherein assigning the weight values to the feature vectors of the reference image set corresponding to the second domain comprises:
    computing a measure of difference between the probability distribution of the feature vectors associated with each image set in the first domain and the probability distribution of the feature vectors associated with the reference image set in the second domain; and assigning a unique weight value to each of the feature vectors of the reference image set corresponding to the second domain based on the computed measure.

6. An apparatus comprising:
a processor; and
a memory coupled to the processor, wherein the memory comprises an image quality assessment module configured to:
   obtain features from each image set of a plurality of image sets;
   generate a set of quality scores for each image set of the plurality of image sets based on the corresponding features;
   compare the set of quality scores corresponding to the plurality of image sets; and
   automatically determine at least one image set of the plurality of image sets having an optimal perceptual visual quality among the plurality of image sets based on the outcome of the comparison.

7. The apparatus according to claim 6, wherein the image quality assessment module is configured to declare the at least one image set having the optimal perceptual visual quality among the plurality of image sets.

8. The apparatus of claim 6, wherein the generation of the set of quality scores for each of the image sets comprises:
   generation, by the image quality assessment module, feature vectors corresponding to the features obtained from each of the image sets; and
   computation, by the image quality assessment module, the set of quality scores corresponding to the feature vectors associated with each of the image sets.

9. The apparatus of claim 8, wherein the generation of the set of quality scores corresponding to the feature vectors comprises:
   generation, by the image quality assessment module, of a probability distribution of the feature vectors of each of the image sets corresponding to a first domain;
   determination, by the image quality assessment module, whether there is overlap between the probability distribution of the feature vectors of each of the image sets corresponding to the first domain and probability distribution of feature vectors of a reference image set corresponding to a second domain;
   assignment, by the image quality assessment module, of weight values to the feature vectors of the reference image set corresponding to the second domain when overlap between the probability distribution of the feature vectors in the first domain and the second domain exists;
   retraining, by the image quality assessment module, of a regressor algorithm for each of the image sets based on the feature vectors associated with the reference image set, the corresponding weight values, and corresponding quality scores; and
   computation, by the image quality assessment module, of the set of quality scores corresponding to the feature vectors associated with each of the plurality of image sets in the first domain using the respective retrained regressor algorithm.

10. The apparatus of claim 6, wherein the assignment of the weight values to the feature vectors of the reference image set corresponding to the second domain comprises:
   computation of a measure of difference between the probability distribution of the feature vectors associated with each image set in the first domain and the probability distribution of the feature vectors associated with the reference image set in the second domain; and
   assignment of a unique weight value to each of the feature vectors of the reference image set corresponding to the second domain based on the computed measure of difference.

11. A non-transitory computer-readable storage medium that stores instructions executable by a computing device, the instructions comprising:
   obtaining features from each image set of a plurality of image sets;
   generating a set of quality scores for each image set of the plurality of image sets based on the corresponding features;
   comparing the set of quality scores corresponding to the plurality of image sets; and
   automatically determining at least one image set of the plurality of image sets having an optimal perceptual visual quality among the plurality of image sets based on the outcome of the comparison.

12. The non-transitory computer-readable storage medium of claim 11, wherein the instructions further comprise:
   declaring the at least one image set as having optimal perceptual visual quality among the plurality of image sets.

13. The non-transitory computer-readable storage medium of claim 11, wherein generating the set of quality scores for each of the image sets comprises:
   generating feature vectors corresponding to the features obtained from each of the image sets; and
   computing the set of quality scores corresponding to the feature vectors associated with each of the image sets.

14. The non-transitory computer-readable storage medium of claim 13, wherein generating the set of quality scores corresponding to the feature vectors comprises:
   generating a probability distribution of the feature vectors of each of the image sets corresponding to a first domain;
   determining whether there is overlap between the probability distribution of the feature vectors of each of the image sets corresponding to the first domain and a probability distribution of feature vectors of a reference image set corresponding to a second domain;
   assigning weight values to the feature vectors of the reference image set corresponding to the second domain when overlap between the probability distribution of the feature vectors in the first domain and the second domain exists;
   retraining a regressor algorithm for each of the image sets based on the feature vectors associated with the reference image set, the corresponding weight values of the feature vectors, and corresponding quality scores; and
   computing the set of quality scores corresponding to the feature vectors associated with each of the image sets in the first domain using the respective retrained regressor algorithm.

15. The storage medium of claim 14, wherein assigning the weight values to the feature vectors of the reference image set corresponding to the second domain comprises:
   computing a measure of difference between the probability distribution of the feature vectors associated with each image set in the first domain and the probability distribution of the feature vectors associated with the reference image set in the second domain; and assigning a unique weight value to each of the feature vectors of the reference image set corresponding to the second domain based on the computed measure.

* * * * *